(12) United States Patent
Wessling et al.

(10) Patent No.: US 7,469,380 B2
(45) Date of Patent: Dec. 23, 2008

(54) DYNAMIC DOCUMENT AND TEMPLATE PREVIEWS

(75) Inventors: Cynthia Dahl Wessling, Redmond, WA (US); Benjamen Eric Ross, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 224 days.

(21) Appl. No.: 10/868,378

(22) Filed: Jun. 15, 2004

(65) Prior Publication Data

US 2005/0278625 A1 Dec. 15, 2005

(51) Int. Cl.
*G06F 7/04* (2006.01)
*G06F 7/20* (2006.01)

(52) U.S. Cl. .................. 715/273; 715/274; 715/277; 715/203

(58) Field of Classification Search ............. 715/502, 715/838, 211, 203, 273, 274, 277; 345/581
See application file for complete search history.

(56) References Cited

U.S. PATENT DOCUMENTS

| | | | | |
|---|---|---|---|---|
| 5,680,629 | A | | 10/1997 | Slayden et al. ............. 395/789 |
| 5,761,655 | A | * | 6/1998 | Hoffman ..................... 707/4 |
| 5,903,905 | A | | 5/1999 | Andersen et al. ............. 707/526 |
| 6,161,125 | A | * | 12/2000 | Traversat et al. ............. 709/203 |
| 6,313,824 | B1 | | 11/2001 | Meisner et al. .............. 345/150 |
| 6,606,105 | B1 | * | 8/2003 | Quartetti ..................... 715/853 |
| 6,616,702 | B1 | | 9/2003 | Tonkin ........................ 715/515 |
| 6,753,974 | B1 | * | 6/2004 | Hoel et al. .................. 358/1.15 |
| 6,760,048 | B1 | * | 7/2004 | Bates et al. ................. 715/797 |
| 6,882,344 | B1 | * | 4/2005 | Hayes et al. ................ 345/467 |
| 7,047,502 | B2 | * | 5/2006 | Petropoulos et al. ........ 715/781 |
| 2003/0012436 | A1 | * | 1/2003 | Lyford et al. ............... 382/167 |
| 2003/0055871 | A1 | * | 3/2003 | Roses ......................... 709/203 |

OTHER PUBLICATIONS

Joe Habraken, "Sams Teach Yourself Microsoft Publisher 2000 in 10 Minutes", May 6, 1999, Sams, pp. A1-P1, A—P2, L5-P5, L5-P6.*
Smith et al, "Scalable Multimedia Delivery for Pervasive Computing", Oct. 1999, ACM, pp. 131-140.*

* cited by examiner

*Primary Examiner*—Stephen S Hong
*Assistant Examiner*—Wilson Tsui
(74) *Attorney, Agent, or Firm*—Merchant & Gould; Ryan T. Grace

(57) ABSTRACT

Methods and systems are provided for dynamically generating and displaying previews of documents or templates of interest to a user. As a user provides or selects customized designs or themes, including color themes, font types, images, and the like, previews of one or more documents or templates to which the user selected designs or themes are applied are dynamically generated and are displayed to allow the user to select an actual document or template for use.

25 Claims, 8 Drawing Sheets

DYNAMIC DOCUMENT AND TEMPLATE PREVIEWS

FIELD OF THE INVENTION

The present invention generally relates to presentation of computer-generated documents. More particularly, the present invention relates to dynamic generation and display of previews of computer-generated documents and templates.

BACKGROUND OF THE INVENTION

With the advent of the computer age, computer and software users have grown accustomed to user-friendly software applications that help them write, calculate, organize, prepare presentations, send and receive electronic mail, make music, and the like. Modern word processing applications, for example, allow users to create and edit a variety of useful documents. Modern desktop publishing applications, for another example, allow users to create a variety of useful documents and presentations such as newspapers, newsletters, brochures, advertisement layouts, stationery, and the like.

Many software applications such as word processing applications, desktop publishing applications, slide presentation applications, spreadsheet applications, and the like allow users to select documents or templates from a collection of pre-prepared documents or templates having pre-populated stylized designs and/or color schemes. For example, a catalogue of documents or templates may be provided from which a user may select a form document or template to prepare a brochure, flyer, advertisement sheet, sign, business card, memorandum, letter, resume and a variety of other helpful and useful documents.

In prior systems, such catalogues of documents are prepared in advance by developers of the providing software application and are presented to a user as a collection of static bitmaps from which the user may select a particular document or template for use. Once the user selects a particular document from the bitmap previews of available documents or templates and opens it in the providing software application, the user may make and save changes to the selected document by changing the pre-prepared stylized designs or color schemes applied to the document.

Unfortunately, because the previews of documents or templates from which the user may choose are provided in static bitmap format, the previews do not update "on the fly" as users change options (e.g., color schemes and stylization) that affect the look of a document or template prior to actual document selection. That is, the user must select a document from the pre-formatted previews, open the document in the application, and then make desired design and theme changes to the selected document. If the user then realizes that the selected document is not the preferred choice, the user must go back to the pre-formatted collection of previews to make another selection.

Accordingly, there is a need for a method and system for providing dynamically updated previews of documents or templates as users change options that affect the look of one or more documents or templates prior to selection of a particular document or template for use. It is with respect to these and other considerations that the present invention has been made.

SUMMARY OF THE INVENTION

Embodiments of the present invention solve the above and other problems by providing document previews that are updated dynamically in response to user inputs. According to one aspect of the invention, a user may create custom document designs or themes including custom color schemes for application to one or more documents. As a user makes design or theme selections, previews of documents to which the user's design selections are to be applied are dynamically updated and are presented to the user for review in bitmap format.

According to other aspects of the invention, a user may select customized designs or themes provided by the software application with which the user is editing one or more documents for application to documents or templates contained in a catalogue or collection of documents or templates provided by the user's software application. In response to the user's design or theme selections, previews of the collection or catalogue of documents or templates are dynamically updated and displayed to allow the user to see the results of the user's design choices before the user actually selects a particular document for use.

According to another aspect of the invention, a method is provided for generating a dynamic document or template preview. A maximum target size (i.e., physical dimension of displayed preview) of a selected document preview is first stored. An empty replacement table is created for storing information regarding colors, font types and identifications, text runs, pictures, or sub-images that may be applied to the dynamic preview. An empty display record list for the selected preview is next generated, and a list of display records for the selected preview is then prepared comprising information identifying attributes required for generating and displaying the selected preview according to user design and/or theme choices. For improved performance, any display records that will not affect the end result of the displayed preview may be removed from the list of display records for the selected preview. Any regions of the dynamic preview which overlap and which will not be visible in the dynamic preview may be reduced to decrease memory requirements and to increase performance. Next, the file header, replacement tables and display record lists for the selected dynamic preview are consolidated into a contiguous block and are stored into memory.

If desired, the complexity of any path, consisting of an ordered list of two or more points that will be connected for displaying the preview, may be reduced by removing points that will not significantly affect the display of the preview when the preview is rendered in bitmap format. Likewise, the complexity of any regions of the selected preview, consisting of a closed path, may be reduced by removing points that are unnecessary for rendering the bitmap of the dynamic preview. The complexity of pictures associated with the selected preview may also be reduced by rendering the picture as a bitmap at the size needed to render the preview at the maximum target size.

In order to display the dynamic preview, each replacement table may be enumerated, and any records in the replacement tables that need to be displayed differently from the originally displayed preview are changed to include information associated with user design or theme input. An empty bitmap is created at a target resolution. Each display record is then rendered in order from bottom to top in the bitmap. As each display record is being rendered, all appropriate elements are drawn from the replacement tables for rendering in the bitmap.

The generated bitmap is then displayed onto the user's computer display screen via any suitable software application functionally capable for displaying a bitmap image. If desired, performance of rendering the dynamic previews may be improved by caching bitmaps of the selected image displayed with various combinations of values from the replacement tables. The size of a group of dynamic previews may be further reduced by consolidating the group of dynamic previews into a single file.

These and other features and advantages, which characterize the present invention, will be apparent from the reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to methods and systems for dynamically generating and displaying previews of documents or templates of interest to a user. As a user provides or selects customized designs or themes, including color themes, font types, images, user-entered text, and the like, previews of one or more documents or templates to which the user selected designs or themes are applied are dynamically generated and are displayed to allow the user to select an actual document or template for use.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
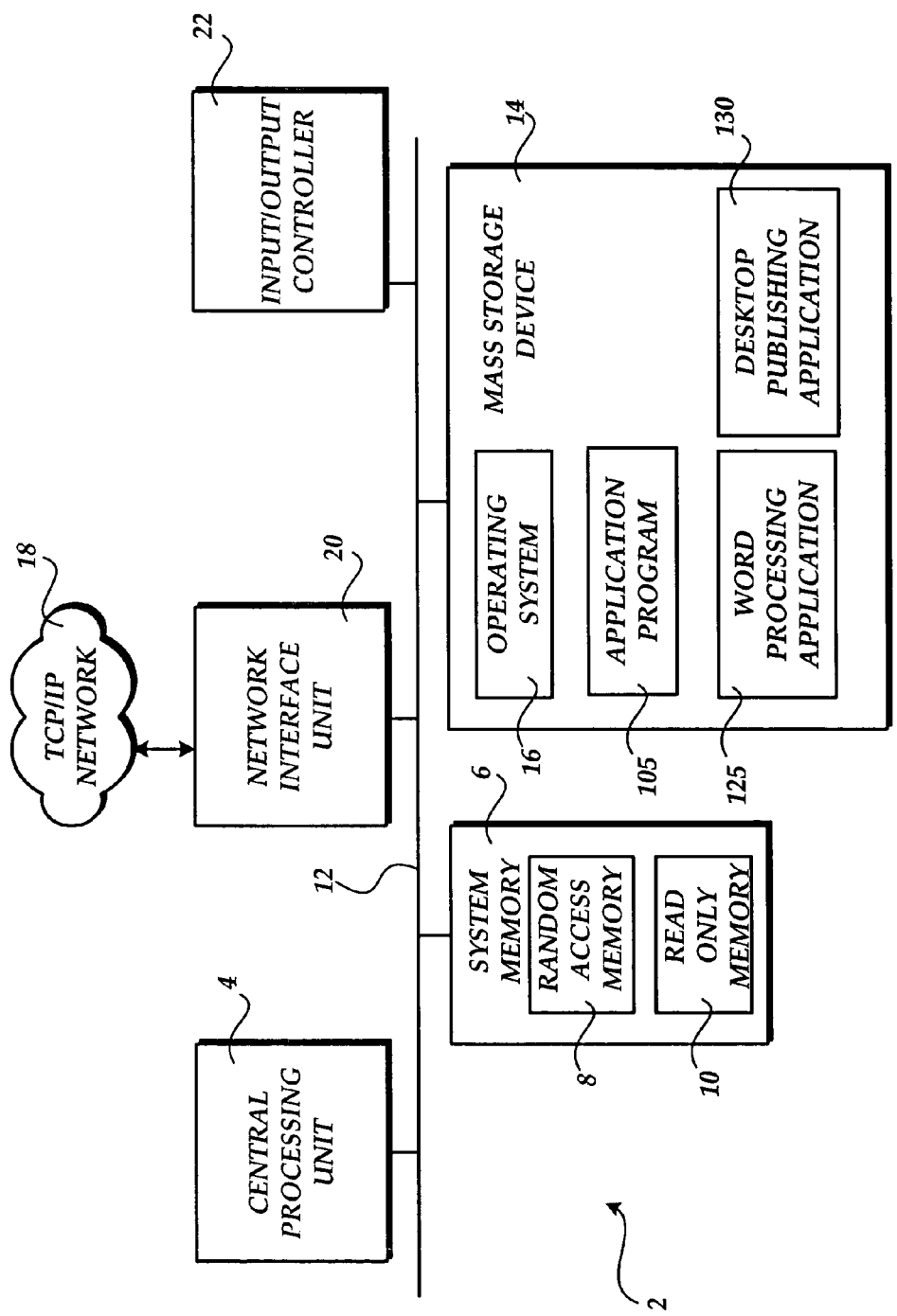
FIG. 1 illustrates an exemplary computing operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 105 for providing a variety of functionalities to a user. For instance, the application program 105 may comprise many types of programs such as a word processing application program 125, a spreadsheet application, a slide presentation application, a desktop publishing application 130, or a document design application suitable for generating and displaying dynamic previews as described herein.

According to an embodiment of the present invention, each of the application programs 105, 125, 130 contain sufficient computer-executable instructions for generating dynamic previews as described herein. An example word processing application 125 for use in accordance with the present invention is WORD manufactured by Microsoft Corporation. An example desktop publishing application 130 for use in accordance with the present invention is PUBLISHER manufactured by Microsoft Corporation. An example slide presentation program (not shown) for use in accordance with the present invention is POWERPOINT manufactured by Microsoft Corporation. An example spreadsheet application (not shown) for use in accordance with the present invention is EXCEL manufactured by Microsoft Corporation. As should be appreciated, the present invention may be operated by a variety of other software applications capable of generating dynamic previews as described herein.

As briefly described above, according to one embodiment of the present invention, a user may create custom document designs or themes for application to one or more documents or templates. That is, the user may create and store a customized design or theme including such design and theme attributes as colors, images, stylized markings, logos, text, font styles, and the like. Once the user generates and stores a particular customized design or theme, the stored design or theme may be applied to one or more documents or templates selected by the user. According to one embodiment of the present invention, the stored customized designs or themes may be utilized by a suite of software applications, such as a word processing application, a desktop publishing application, a slide presentation application, a spreadsheet application, and the like for applying the generated and stored customized design to one or more documents generated by any of these software applications.

Figure 2:
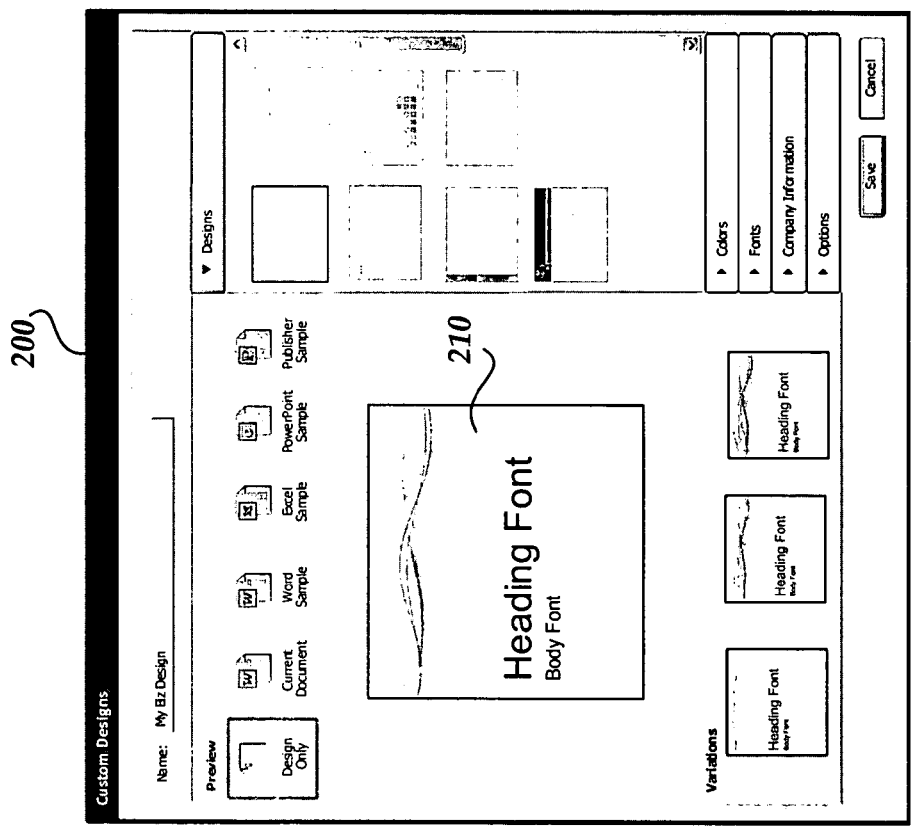
FIG. 2 illustrates a computer screen display showing the launching of an abstract representation of one or more document design selections.

The following description of FIGS. 2 through 7 provides illustrations of generation of dynamic document or template previews according to embodiments of the present invention. It should be understood that actual implementations of embodiments of the present invention may be utilized with many document or template types or in the context of many software applications in addition to those illustrated in FIGS. 2 through 7. Referring now to FIG. 2, the user interface 200 is illustrative of a user interface provided for generation of a customized design or theme according to embodiments of the present invention. The preview 210 is displayed in bitmap format in the user interface. The preview is an abstract representation of the current design selections applied by the user. Along the bottom side of the user interface are stored three smaller previews of the design tile showing variations on design selections. At the right side of the user interface 200, a number of different design selections showing various design or theme attributes are provided for user selection. At the bottom right side of the user interface 200 are additional design and/or theme functions which allow the user to select other customized design or theme attributes including customized color themes, font schemes, company information, such as logos, and the like.

Figure 3:
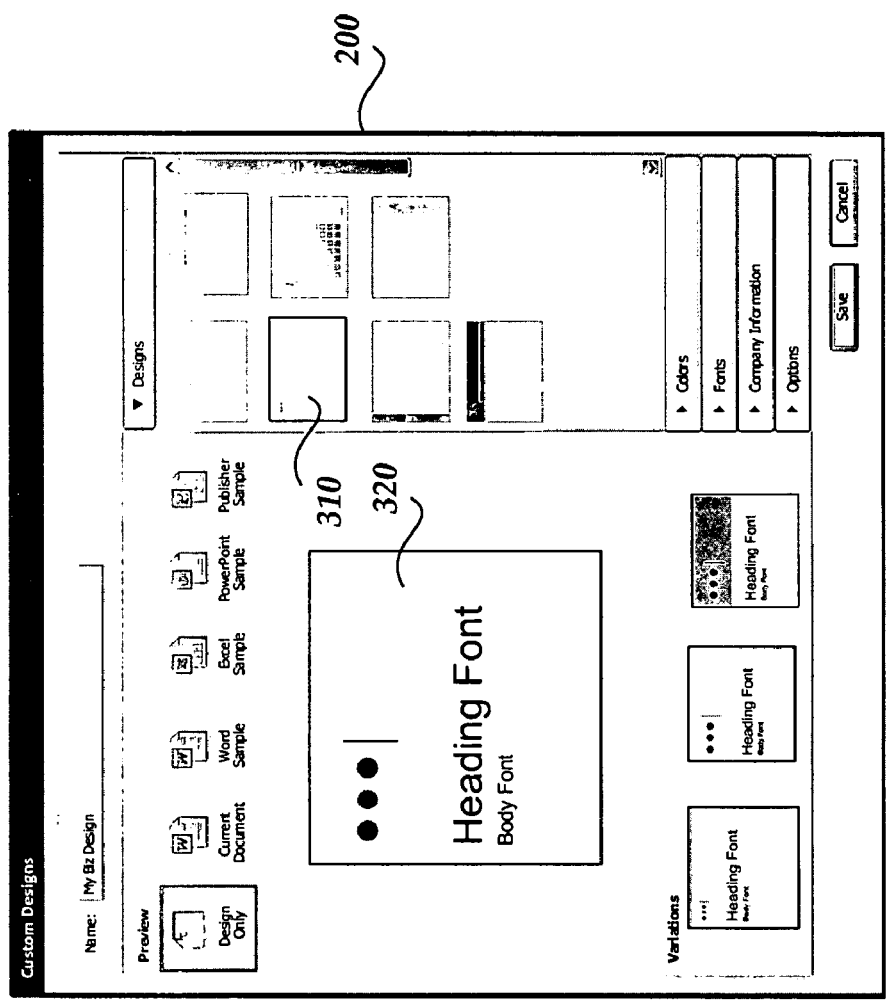
FIG. 3 illustrates a computer screen display showing a dynamic preview of a selected document or template customized with user input design or theme attributes.

Referring to FIG. 3, when the user selects a different design from the design selection pane, the design and/or theme attributes associated with the selected design are automatically and dynamically applied to the design preview to generate a new dynamic preview 320 illustrated in the center of the user interface 200. As should be understood, the user may continue to dynamically update the preview by selecting other design customizations. For example, the user may select a customized color scheme for application to the dynamic preview, and the dynamic preview will be automatically updated to include the selected color scheme applied to portions of the document or template formatted for receiving colorization. Likewise, customized fonts may be applied to text selections or images, and those images may be added to the dynamic preview by selecting images such as company logos from a collection or catalogue of images. Importantly, with each customized design or theme change applied by the user, the displayed preview of the selected document is dynamically updated to allow the user to quickly see the results of design and/or theme options selected by the user.

Figure 4:
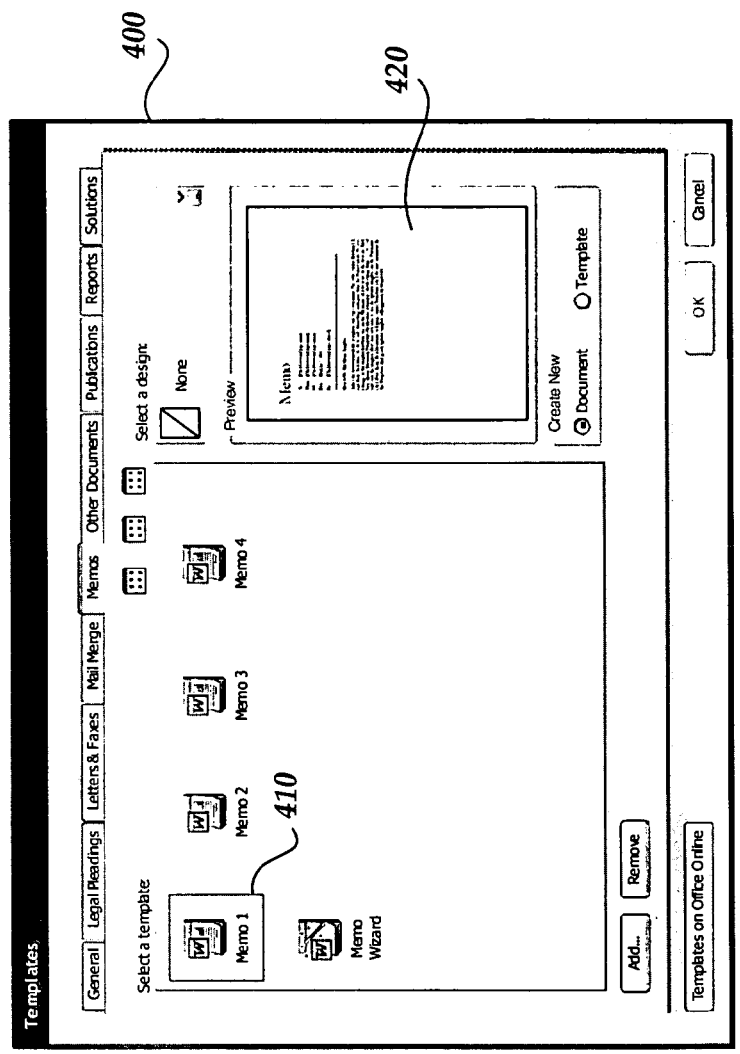
FIG. 4 illustrates a computer screen display displaying a currently selected document.
Figure 5:
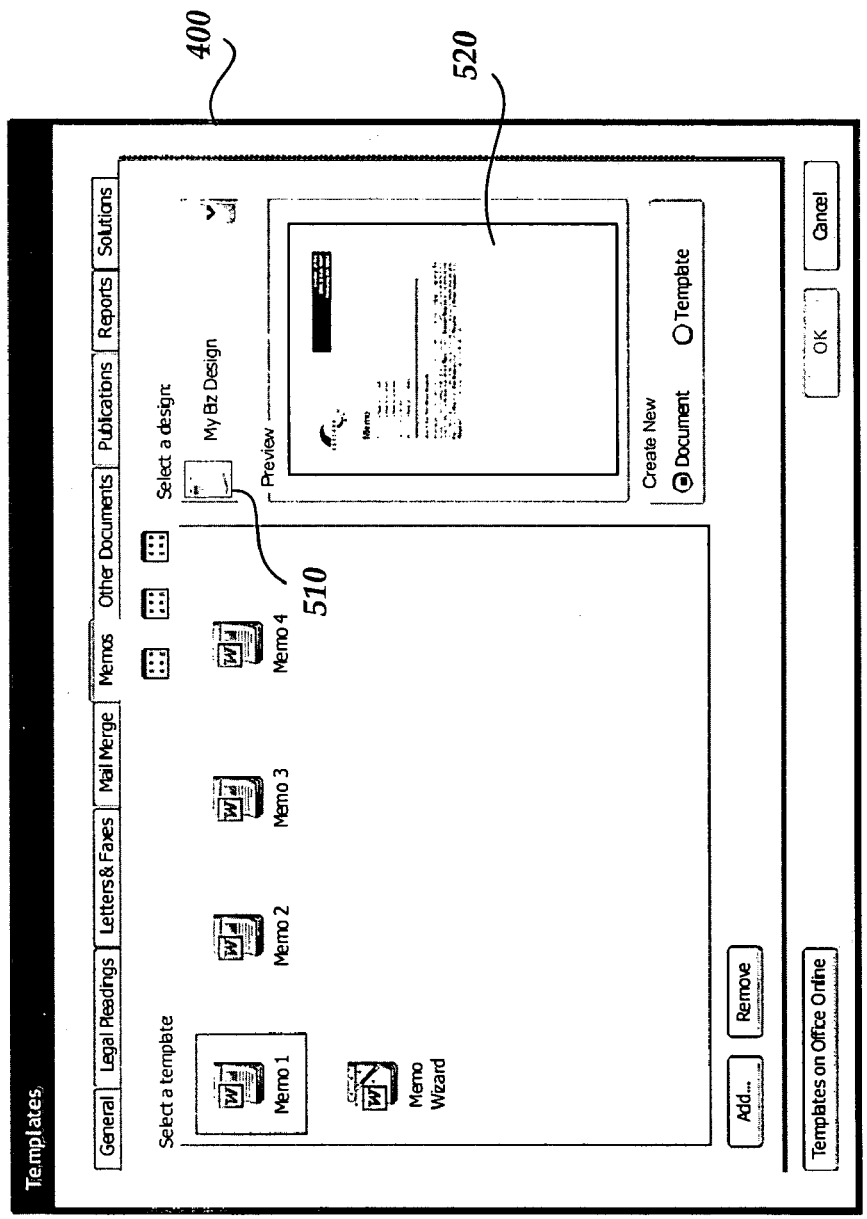
FIG. 5 illustrates a computer screen display illustrating application of user selected designs or themes applied to the selected document illustrated in FIG. 4.

Referring to FIGS. 4 and 5, exemplary use of embodiments of the present invention for providing dynamic previews of document templates according to embodiments of the present invention is described. As shown in FIG. 4, a user interface 400 is provided with which the user may select a document template from a collection of document templates. For example, the collection of document templates may include a variety of pre-formatted templates for such documents as resumes, purchase orders, advertising materials, brochures, memoranda, letters, and the like. As should be understood by those skilled in the art, the user may select a template from the collection of templates for use in preparation of a desired document. According to embodiments of the present invention, once the user selects a template 410 from the template selection pane, a preview 420 of the selected template is provided in a preview pane illustrated in FIG. 4.

Referring to FIG. 5, if the user desires to apply to the document preview 520 a previously prepared customized design or theme, as described above with reference to FIGS. 2 and 3, or if the user wishes to apply to the document preview 520 a pre-formatted design or theme, the user may selected the desired design or theme from a design selection pane 510. As should be understood, a particular design or theme may include one or more selected colors schemes, selected fonts, and selected design elements, such as shading, stylization, logos, and data such as company addresses and the like, in addition to other elements. Once the user selects a previously customized design or theme or a pre-formatted design or theme from the design selection pane 510, a new document preview 520 is automatically generated and is presented to the user. The attributes associated with the design or theme selected by the user are applied to the generated dynamic preview. Thus, the user may quickly and easily review the results of application of the selected design or theme to a given document prior to actually selecting the document for use.

Figure 6:
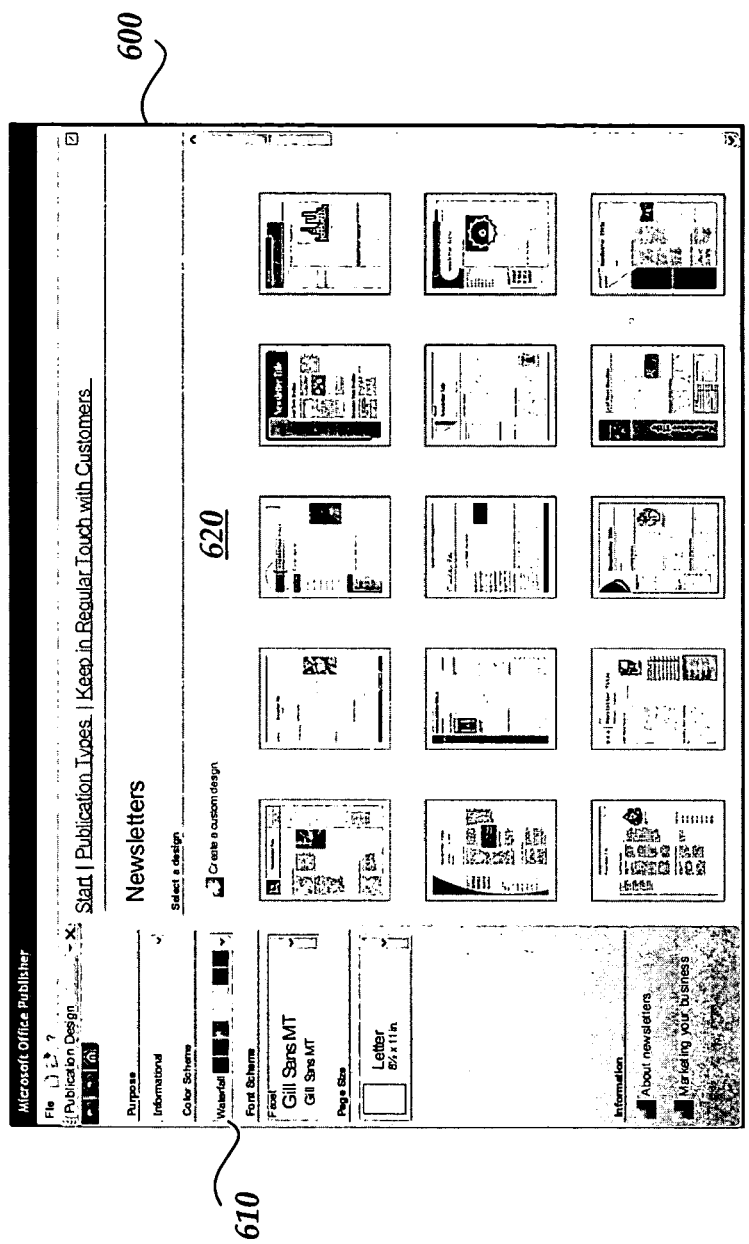
FIG. 6 illustrates a computer screen display showing a catalogue of document or template previews.
Figure 7:
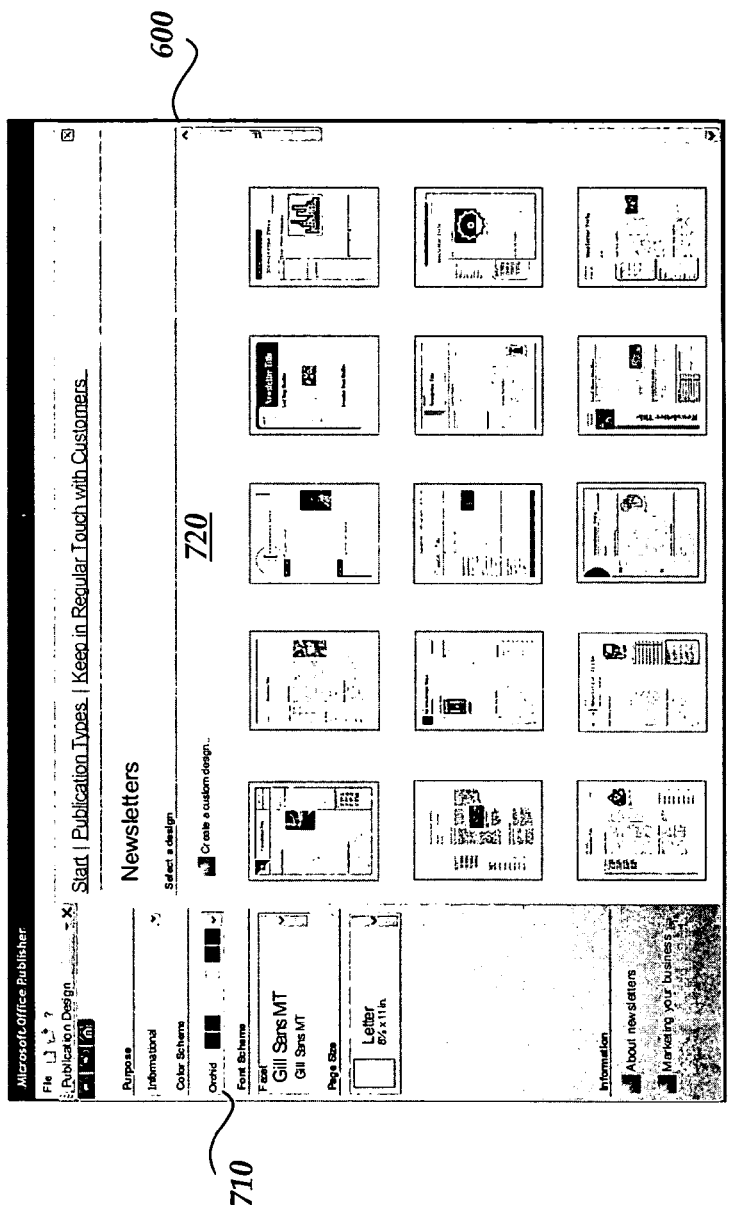
FIG. 7 illustrates a computer screen display showing the catalogue of document or template previews illustrated in FIG. 6 dynamically updated to reflect design or theme attributes applied by a user.

FIGS. 6 and 7 illustrate operation of embodiments of the present invention with respect to a catalogue of document previews that may be utilized by a user for selecting a given document or document template. Referring to FIG. 6, a user interface 600 is utilized for displaying a catalogue of bitmap formatted document previews from which the user may select an actual document for use. For purposes of example, the document previews 620 shown in FIG. 6 illustrate different versions of document templates that may be used for preparing a newsletter. As should be understood, many other types of document templates such as memoranda, brochures, advertisement sheets, purchase orders, business cards, and the like may be displayed in the user interface 600 for illustrating variations of a selected template. As illustrated in FIG. 6, a color scheme 610 has been applied to each of the template previews 620. For example, a color scheme named "waterfall" has been applied to each of the displayed previews. That is, in each of the displayed previews, areas of the bitmap previews designed for receiving colorization have received color according to the selected color scheme to allow the user to review the look of each of the document previews with the selected color scheme.

Referring to FIG. 7, if the user selects a different color scheme 720, for example "orchid," a new set of document previews 720 is automatically generated wherein each of the fields or areas of the previews designed for colorization are colored with the newly selected color scheme. Advantageously, the user may quickly review the dynamic template previews with the newly applied color scheme to determine whether the user prefers the second color scheme instead of the first color scheme. The user may select and apply additional color schemes as desired until the user is satisfied with a particular color scheme. Once the user is satisfied with a particular color scheme, the user may then select one of the dynamically updated template previews for displaying an actual document template associated with the selected preview.

According to embodiments of the present invention, a dynamic preview is format for storing images. An image may consist of multiple records describing a specific element to display on a screen, including a path, a region, a picture, or a text run. Characteristics of the image may be quickly replaced at the time of displaying a given dynamic preview. For example, fonts and colors may be quickly replaced in a given image at display time. An image may be reduced in complexity to optimize the speed, efficiency and memory use associated with displaying the image. For example, small objects that may not be visible given the miniature size of the displayed preview may be eliminated all together. Text may be displayed in "obfuscated" format, and certain shapes may be simplified.

Images for use with a dynamic preview are generated from a source document. The source document may contain the shapes, pictures and text that are desired for a given preview. A given image may be generated from a page in a source document, including all of the objects on the page, or from a subset of the objects on a given page. According to embodiments of the invention, certain elements within the source document may be tagged for replacement. The elements that may be replaced are elements for which the user may apply user-specified design attributes for creating a dynamic preview. For example, colors, fonts, text runs, pictures, or groups of objects may be tagged for replacement. According to one embodiment, any element that may be replaced at display time of a given dynamic preview must be tagged. The tag may consist of a unique name for the given object to which it is associated.

Figure 8:
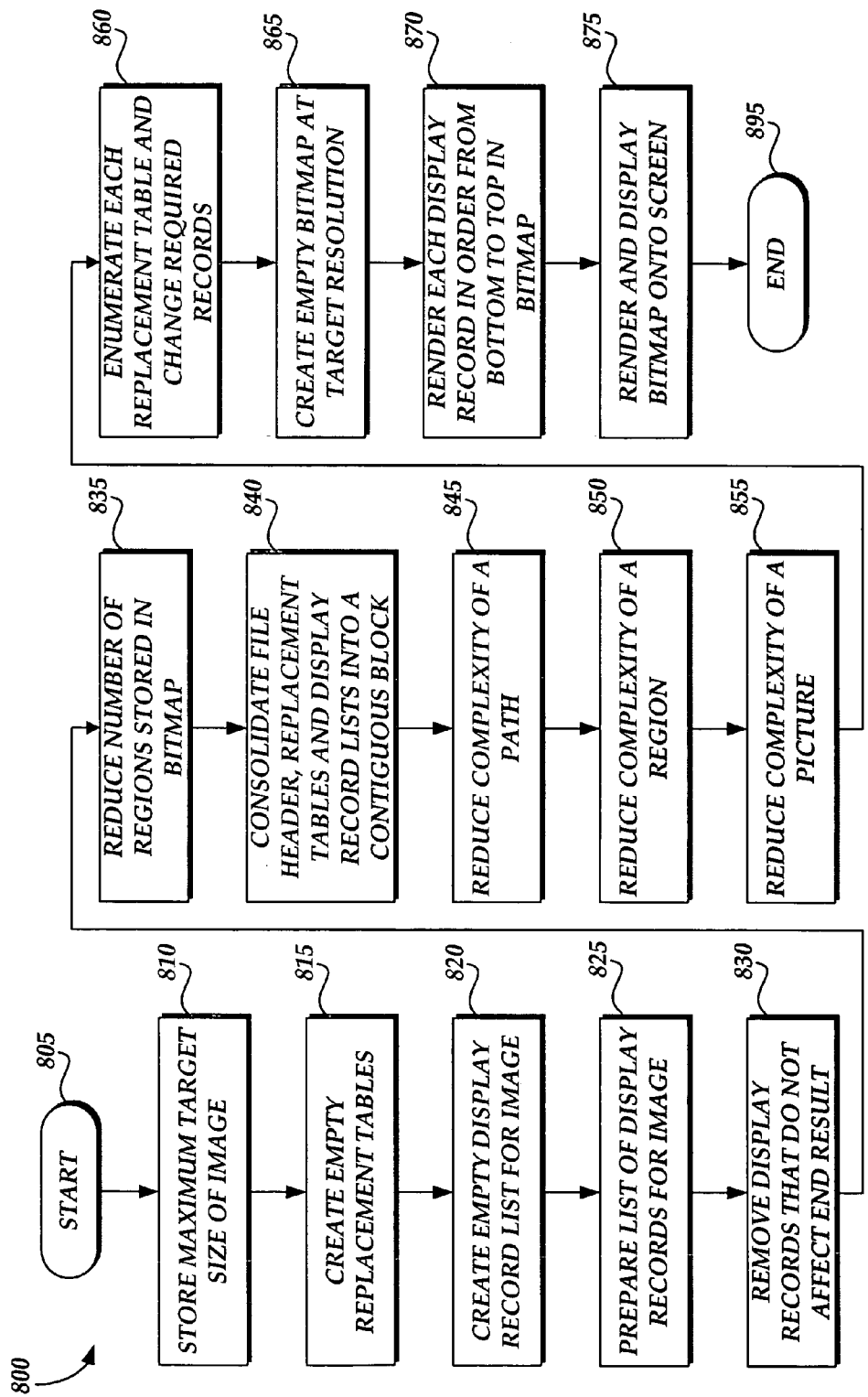
FIG. 8 is a flow diagram showing an illustrative routine for generating and displaying dynamic document or template previews according to embodiments of the present invention.

FIG. 8 is a flow diagram showing an illustrative routine for generating and displaying dynamic previews according to embodiments of the present invention. In order to generate a dynamic preview, an illustrative routine 800 begins at start block 805 and proceeds to block 810. At block 810, a maximum target size for the dynamic preview is stored. The maximum target size for the image may consist of an X and Y pixel count of the largest size at which the preview should be rendered for display fidelity. Ideally, the maximum target size is less than 256 pixels in each direction so that single bytes of memory may be used to store coordinates in order to reduce memory usage. At block 815, empty replacement tables are created for attributes of the dynamic preview including colors, font identifications, text runs, pictures, sub-images, and the like.

At block 820, an empty display record list is created for the dynamic preview. At block 825, a list of display records for the preview are prepared to include information associated with attributes for the given dynamic preview. For each object in the source document, the following information is obtained and is populated in the display record list for the selected dynamic preview. If an object is tagged for replacement, a new display record is created containing the bounded rectangle of the object and an identification for the object. The display record list is completed with records needed to display the image. Paths needed to display the objects for rendering in the preview are identified. For each path the complexity of the path may be reduced, as described below, and a display record is added to the display record list for the path. The display record references the color replacement table for all color values associated with the path. Regions needed to display an object in the preview are identified, and the complexity of each region may be reduced, as described below. A display record is added to the display record list for each identified region. Pictures needed to display an object are identified, and the complexity of the pictures may be reduced, as described below. A display record is added to the display record list for each picture.

Text runs needed for display in the preview are next identified. According to embodiments of the present invention, for the first text run on the preview, if the line height is above a predetermined threshold (measured in pixels rendered at the maximum target size), then a display record is added to the display record list for rendering the text. The display record may reference the text replacement table for the text to render. If the line height is not above a predetermined threshold, an "obfuscated" text display record is added to the display record list for the first text run. For all subsequent text runs, an "obfuscated" text display record is added for each subsequent text run to the display record list. For each of the subsequent lines of text in the text run, a predetermined set of characteristics is considered for a given line of text. For example, font name, character spacing, and font weight may be considered. An obfuscation style may be chosen from a predetermined list of the most appropriate greeking styles for each combination of text characteristics. The selected obfuscation style and the position of the associated text on the line are stored in the display record.

Referring now to block 830, after the list of displayed records has been generated for a given dynamic preview, as described above, display records that do not affect the end result of the displayed image may be removed for optimization purposes. According to a first embodiment, display records may be removed by first creating an empty bitmap at the maximum target size. Next, using the empty bitmap, an iterative process is performed where the bitmap is prepared by rendering information from a first display record onto the bitmap. This bitmap is saved as a first bitmap. A second bitmap is then generated by rendering information from a second display record into the first saved bitmap. The second bitmap is compared against the first bitmap. If the first and second bitmaps are identical, then the first display record rendered onto the bitmap may be removed because given the maximum target size of the empty bitmap which will be utilized for displaying the final dynamic preview, information from the second display record covers or otherwise removes information from the first display record from visual perception. Consequently, removal of information associated with the first display record will not affect the end result of the displayed dynamic preview.

According to an alternative method for removing unneeded display records, an empty bitmap may be created at the maximum target size. For each display record in the list of display records, another bitmap may be created at the maximum target size. For each display record N in the list of display records, a second empty bitmap is generated at the maximum target size. Into the second empty bitmap, all display records except display record N are rendered onto the second bitmap. The first bitmap is compared against the second bitmap. If the first and second bitmaps are identical, then the display record N is removed from the display record list. This process may be repeated iteratively to test the requirement for each display record. That is, any display record is removed from the display record list whereby the removal of the given display record does not affect the outcome of the displayed dynamic preview.

At block 835, regions stored in the bitmap that overlap with each other may be reduced by consolidating regions. That is, any regions in the document represented by the dynamic preview that are overlapped and thus not visible when those regions are rendered in the bitmap for display as a dynamic preview are consolidated to improve performance and reduce memory requirements. At block 840, the file header, replacement tables and display record lists are consolidated into a contiguous block and are stored into memory.

As mentioned above with respect to block 825, for performance sake, the complexity of paths may be reduced. At block 845, a complexity of paths associated with a selected dynamic preview may be reduced as follows. A path consists of an ordered list of two or more points which will be connected using a Windows Pen at display time. Reducing the complexity of a path means removing points that will not significantly affect how the preview is rendered at its reduced size. In order to reduce the complexity of a path, each of the points in the path is enumerated. For each point N in the path except the last point, if point N renders at the same pixel as the next point (N+1), remove the point N+1 from the list. Next, a counter N is set to 0, and the following loop is run. If N+2 is greater than the number of points in the path, exit the loop. Next, consider the angle between points N and N+1 to be A1, the angle between N and N+2 to be A2, and the angle between N+1 and N+2 to be A3. If A1 is within X degrees (where X is tunable) of A2, and A3 is within X degrees of A2, remove the point N+1. If the point N+1 is removed, determine if N+2 is greater than the number of points in the path, and if so, continue as set out above. If the point N+1 is not removed, increment N and determine if N+2 is greater than the number of points in the path, and if so, continue as set out above.

As mentioned above with respect to block 825, for performance sake, the complexity of regions also may be reduced. At block 850, the complexity of regions comprising the selected dynamic preview may be reduced as follows. A region consists of a closed path (a path where the first and last points are themselves connected with a line) that is filled with a Windows Brush. Reducing the complexity of a region is the similar to reducing the complexity of a path, described above, whereby unnecessary points are removed from rendering in the bitmap.

As mentioned above with respect to block 825, for performance sake, the complexity of pictures also may be reduced. At block 855, the complexity of pictures associated with the selected dynamic preview may be reduced as follows. In order to reduce the complexity of a picture, the picture is rendered as a bitmap at the size needed to render the image at the maximum target size. The picture may also be rendered with a depth of 256 colors instead of the depth the picture had in an original document preview. The rendered pictures are stored in a lookup table, and if the picture is already rendered at the needed size in the lookup table, the pre-existing picture is referenced for rendering in the dynamic preview bitmap instead of storing a new copy.

In order to display a given dynamic preview, at block 865, each replacement table is enumerated and any records in the replacement tables that should be displayed differently from the original preview are changed to include information selected by the user such as particular color schemes and fonts. At block 865, an empty bitmap is created at the desired target resolution. At block 870, each display record is rendered in order from bottom to top into the bitmap. As each display record is rendered, appropriate elements for rendering the bitmap are retrieved from the replacement tables. At block 875, the bitmap (dynamic preview) is displayed onto the user's computer screen display via a software application in use by the user for displaying the dynamic preview.

According to an embodiment of the present invention, the speed of rendering the dynamic preview may be increased by caching bitmaps of the preview displayed with certain combinations of replacement table values. A data structure is added to the preview image format that stores pairs of bitmaps and replacement table hash values, referred to as the image cache. At render time, all of the replacement table values are hashed, and the image cache is reviewed to determine if a bitmap already exists. If a bitmap does exist, the bitmap is displayed. This bitmap may be enlarged, if necessary to fit the target resolution. If a bitmap does not exist, the preview image is rendered into a new bitmap as described above for block 870.

The size of a group of dynamic previews may be further reduced by consolidating the group of dynamic previews into a single file. The single file should contain one instance of each replacement table, and one display record list per original preview. The following steps may be performed to consolidate multiple preview images into a single file. An empty dynamic preview file is created and is referred to as the merged file. A data structure is added to the file that maps from dynamic preview names to display record lists and is referred to as the image list. For each dynamic preview to be added to the file, all of the display records are copied into a new display record list in the merged file. An entry is added to the image list with the name of the dynamic preview being added, and a pointer to the display record list is set for the display new display record list added to the merged file. For each record in each replacement table, if an identical record in the corresponding replacement list of the merged file already exists, all references are replaced to the record in the display record list for the preview image with references to the pre-existing entry in the merged replacement list.

As described herein, methods and systems are provided for dynamically generating document or template previews based upon user-selected designs and/or themes. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method of generating and displaying dynamic document previews, comprising:

providing a suite of applications, wherein each application of the suite of applications is different, wherein replaceable attributes of each application are identified by at least one tag that indicates that the attributes are replaceable;

displaying a document preview associated with a first document of one of the applications of the suite of applications, wherein the first document is renderable according to the application of the suite of applications, wherein the application includes dynamically updatable individual documents based on the replaceable attributes identified by the at least one tag, wherein each document preview is associated with a different design theme and includes common content;

receiving a selection of a design for application to the document preview associated with the first document;

applying the selected design to the suite of applications, wherein applying the selected design to the suite of applications includes identifying the at least one tag that indicates that the attributes are replaceable and replacing the attributes indicated by the tag with at least one attribute of the selected design;

automatically generating a bitmap dynamic document preview having the replaceable attributes replaced by the at least one attribute of the selected design, wherein automatically generating the bitmap dynamic document preview includes reducing the complexity of the bitmap dynamic document preview to optimize displaying resources by removing attributes of the application that are not implicated by the display of the bitmap dynamic document preview;

displaying the automatically generated bitmap dynamic document preview, wherein the bitmap dynamic document preview is rendered in a bitmap image format having less fidelity than the first document being renderable according to the application of the suite of applications;

displaying a second document preview associated with a second document of one of the applications of the suite of applications wherein the application includes dynamically updatable individual documents; and automatically propagating the selected design to the second document preview of the second document to generate a second bitmap dynamic document preview.

2. The method of claim 1, whereby automatically generating a dynamic document preview includes:

populating the bitmap dynamic document preview with any user entered text or images; and rendering the bitmap dynamic document preview for display.

3. The method of claim 1, whereby automatically generating a bitmap dynamic document preview includes:

storing a maximum target size for the bitmap dynamic document preview;

creating replacement tables for storing attributes of the design applied to the document preview associated with the first document and for storing attributes of the selected design;

creating a display record list for containing information associated with an object to be rendered in the bitmap dynamic document preview;

populating the display record list with information associated with attributes of the object contained in the document preview associated with the first document to be rendered in the bitmap dynamic document preview;

populating the replacement tables with attributes of the design applied to the document preview associated with the first document, and replacing a record in the replacement tables with corresponding attributes of the selected design;

populating the display records with attributes contained in the replacement tables; and rendering each display record in order from bottom to top in an empty bitmap.

4. The method of claim 3, prior to rendering each display record in order from bottom to top in an empty bitmap, eliminating any display regions that are overlapped by other display regions at the maximum target size and that will not be displayed in the bitmap dynamic document preview.

5. The method of claim 3, prior to rendering each display record in order from bottom to top in an empty bitmap, reducing the complexity of any line paths identified in any display record by removing points in the any line paths whereby the removal of the points will not affect a visual appearance of a the displayed bitmap dynamic document preview containing the any line paths at the maximum target size.

6. The method of claim 3, prior to rendering each display record in order from bottom to top in an empty bitmap, reducing the complexity of regions identified in the display record by removing points in the regions, whereby the removal of the points will not affect a visual appearance of a the displayed bitmap dynamic document preview containing the regions at the maximum target size.

7. The method of claim 3, prior to rendering each display record in order from bottom to top in an empty bitmap, reducing the complexity of pictures identified in the display record, whereby reducing the complexity of the pictures includes:

rendering each of the pictures as a bitmap at a size needed to render the bitmap dynamic preview document at the maximum target size;

storing the rendered pictures in a lookup table; and if any of the pictures stored in the lookup table are already rendered at a required size in the lookup table, referencing the previously rendered picture for rendering in the bitmap dynamic preview document instead of storing a new copy of the referenced picture.

8. The method of claim 1, whereby receiving a selection of a design for application to the document preview associated with the first document includes receiving a selection of a color scheme for application to the document preview associated with the first document.

9. The method of claim 1, whereby receiving a selection of a design for application to the document preview associated with the first document includes receiving a selection of at least one member of a group comprising: a font size, a typeface, and attributes for application to text or images contained in the document preview associated with the first document.

10. The method of claim 1, whereby receiving a selection of a design for application to the document preview associated with the first document includes receiving a selection of pictures for application to the document preview associated with the first document.

11. The method of claim 1, whereby receiving a selection of a design for application to the document preview associated with the first document includes receiving a selection of a stylized object for application to the document preview associated with the first document.

12. A method of generating and displaying dynamic document previews, comprising:
    providing a suite of applications, wherein each application of the suite of applications is different, wherein replaceable attributes of each application are identified by at least one tag that indicates that the attributes are replaceable;
    displaying a document preview associated with a first document of one of the applications of the suite of applications, wherein the first document is renderable according to the application of the suite of applications, wherein the application includes dynamically updatable individual documents based on the replaceable attributes identified by the at least one tag, wherein each document preview is associated with a different design theme and includes common content;
    receiving a selection of a design for application to the document preview;
    applying the selected design to the suite of applications, wherein applying the selected design to the suite of applications includes identifying the at least one tag that indicates that the attributes are replaceable and replacing the attributes indicated by the tag with at least one attribute of the selected design;
    populating a bitmap with attributes of the document preview;
    in the bitmap, replacing attributes of a first design applied to the document preview with corresponding attributes of the selected design;
    rendering the bitmap as a dynamic document preview of the document preview with applied attributes of the selected design; and
    displaying the dynamic document preview.

13. The method of claim 12, prior to rendering the bitmap as a dynamic document preview of the document preview with applied attributes of the selected design, deleting attributes of the first design or the selected design that will not affect a visual appearance of the dynamic preview.

14. The method of claim 12, prior to rendering the bitmap as a dynamic document preview of the document preview with applied attributes of the selected design, eliminating display regions to be rendered in the bitmap that are overlapped by other display regions and that will not visually appear in the displayed dynamic document preview.

15. The method of claim 12, whereby receiving a selection of a design for application to the document preview includes receiving a selection of a color scheme for application to the document preview.

16. The method of claim 12, whereby receiving a selection of a design for application to the document preview associated with the first document includes receiving a selection of at least one member of a group comprising: a font size, a typeface, and attributes for application to text or images contained in the document preview associated with the first document.

17. The method of claim 12, whereby receiving a selection of a design for application to the document preview includes receiving a selection of pictures for application to the document preview.

18. The method of claim 12, whereby receiving a selection of a design for application to the document preview includes receiving a selection of stylized objects for application to the document preview.

19. A computer-readable storage medium containing computer-executable instructions which when executed by a computer perform a method of generating and displaying dynamic document previews, the method comprising:
    providing a suite of applications, wherein each application of the suite of applications is different, wherein replaceable attributes of each application are identified by at least one tag that indicates that the attributes are replaceable;
    displaying a document preview associated with a first document of one of the applications of the suite of applications, wherein the first document is renderable according to the application of the suite of applications, wherein the application includes dynamically updatable individual documents based on the replaceable attributes identified by the at least one tag, wherein each document preview is associated with a different design theme and includes common content;
    receiving a selection of a design for application to the document preview associated with the first document;
    applying the selected design to the suite of applications, wherein applying the selected design to the suite of applications includes identifying the at least one tag that indicates that the attributes are replaceable and replacing the attributes indicated by the tag with at least one attribute of the selected design;
    automatically generating a dynamic document preview having the replaceable attributes replaced by the at least one attribute of the selected design, wherein the dynamic document preview is rendered in a bitmap image format having less fidelity than the first document being renderable according to the application of the suite of applications; and
    displaying the automatically generated dynamic document preview.

20. The method of claim 19, whereby automatically generating a dynamic document preview includes:
    storing a maximum target size for the dynamic document preview;
    creating replacement tables for storing attributes of a first design applied to the document preview associated with the first document and for storing attributes of the selected design;
    creating a display record list for containing information associated with an object to be rendered in the dynamic document preview;
    populating the display record list with information associated with attributes of an object contained in the document preview associated with the first document to be rendered in the dynamic document preview;
    populating the replacement tables with attributes of the first design applied to the document preview associated with the first document, and replacing a record in the replacement tables with corresponding attributes of the selected design;
    populating display records with attributes contained in the replacement tables; and
    rendering each display record in order from bottom to top in an empty bitmap.

21. The method of claim 20, prior to rendering each display record in order from bottom to top in the empty bitmap, deleting display records that will not affect a visual appearance of the dynamic preview.

22. The method of claim 20, prior to rendering each display record in order from bottom to top in an empty bitmap, eliminating display regions that are overlapped by other display regions and that will not be displayed in the dynamic document preview.

23. The method of claim 20, prior to rendering each display record in order from bottom to top in an empty bitmap, reducing the complexity of line paths identified in the display record by removing points in the line paths whereby the removal of the points will not affect a visual appearance of a displayed dynamic preview containing the line paths.

24. The method of claim 20, prior to rendering each display record in order from bottom to top in an empty bitmap, reducing the complexity of the regions identified in the display record by removing points in the regions, whereby the removal of the points will not affect a visual appearance of a displayed dynamic preview containing the regions.

25. The method of claim 20, prior to rendering each display record in order from bottom to top in an empty bitmap, reducing the complexity of pictures identified in the display record, whereby reducing the complexity of the pictures includes:

rendering each of the pictures as a bitmap at a size needed to render the dynamic preview at the maximum target size;

storing the rendered pictures in a lookup table; and if any of the pictures stored in the lookup table are already rendered at a required size in the lookup table, referencing the previously rendered picture for rendering in the dynamic preview bitmap instead of storing a new copy of the referenced picture.

* * * * *

UNITED STATES PATENT AND TRADEMARK OFFICE
CERTIFICATE OF CORRECTION

| | | |
|---|---|---|
| PATENT NO. | : 7,469,380 B2 | Page 1 of 1 |
| APPLICATION NO. | : 10/868378 | |
| DATED | : December 23, 2008 | |
| INVENTOR(S) | : Cynthia Dahl Wessling et al. | |

It is certified that error appears in the above-identified patent and that said Letters Patent is hereby corrected as shown below:

In column 12, line 31, in Claim 5, after "appearance of" delete "a".

In column 12, line 38, in Claim 6, after "appearance of" delete "a".

Signed and Sealed this

Twenty-sixth Day of April, 2011

David J. Kappos
*Director of the United States Patent and Trademark Office*